(12) United States Patent
Hijazi et al.

(10) Patent No.: US 9,100,228 B2
(45) Date of Patent: Aug. 4, 2015

(54) LONG TERM EVOLUTION (LTE) UPLINK CANONICAL CHANNEL ESTIMATION

(75) Inventors: Samer Hijazi, Bethlehem, PA (US); Kameran Azadet, Morganville, NJ (US); Meng-Lin Yu, Morganville, NJ (US); Joseph Othmer, Ocean, NJ (US); Ramon Sanchez Perez, Galapagar (ES)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 210 days.

(21) Appl. No.: 12/907,435

(22) Filed: Oct. 19, 2010

(65) Prior Publication Data

US 2011/0310944 A1 Dec. 22, 2011

Related U.S. Application Data

(60) Provisional application No. 61/355,177, filed on Jun. 16, 2010.

(51) Int. Cl.
*H04B 17/00* (2006.01)
*H04L 25/02* (2006.01)

(52) U.S. Cl.
CPC ........ *H04L 25/0232* (2013.01); *H04L 25/0212* (2013.01); *H04L 25/0226* (2013.01)

(58) Field of Classification Search
CPC ............ H04L 25/0212; H04L 25/0232; H04L 25/226

USPC ......... 375/133, 135, 136, 148, 219, 224, 260, 375/261, 267, 295, 308, 316; 370/208, 210, 370/330, 335, 340, 342, 344, 468
See application file for complete search history.

(56) References Cited

U.S. PATENT DOCUMENTS

| | | | | |
|---|---|---|---|---|
| 2002/0034213 A1* | 3/2002 | Wang et al. | ................... | 375/132 |
| 2008/0031375 A1* | 2/2008 | Zhou et al. | ................... | 375/267 |
| 2010/0080112 A1* | 4/2010 | Bertrand et al. | ............. | 370/208 |
| 2010/0086082 A1* | 4/2010 | Ogawa et al. | ................ | 375/308 |
| 2010/0138465 A1 | 6/2010 | Azadet et al. | ................ | 708/290 |

FOREIGN PATENT DOCUMENTS

WO WO2010055420 5/2010 ............ H04W 24/00

* cited by examiner

*Primary Examiner* — Syed Haider

(57) ABSTRACT

A method and system for canonical channel estimation in the Long Term Evolution uplink where a multi-frequency signal is generated and then converted to frequency spectrum which is then convolved in the frequency domain with a truncated window function to obtain a time domain channel impulse response. The time domain channel impulse response can be then transformed to a frequency domain to produce a down sampled user channel response, which can be then linearly interpolated to provide a channel estimate for a plurality of subcarriers. Such an approach achieves channel estimation within Long Term Evolution at only canonical locations to reduce complexity without loss in channel entropy.

5 Claims, 4 Drawing Sheets

LONG TERM EVOLUTION (LTE) UPLINK CANONICAL CHANNEL ESTIMATION

CROSS-REFERENCE TO PROVISIONAL APPLICATION

This non-provisional patent application claims the benefit of U.S. Provisional Patent Application Ser. No. 61/355,177 filed Jun. 16, 2010, which is hereby incorporated by reference in its entirety.

TECHNICAL FIELD

Embodiments generally relate to digital signal processing. Embodiments further relate to channel estimation in the context of mobile radio systems and communication networks thereof. Embodiments additionally relate to improved channel estimation with respect to LTE (Long Term Evolution) uplinks and associated mobile telecommunications network technology.

BACKGROUND OF THE INVENTION

LTE is a particular standard in mobile telecommunications network technology. The current generation of mobile networks is collectively known as 3G (for "third generation") and generally employs Wideband Code Division Multiple Access (W-CDMA) technology. LTE is a 4th generation standard of radio technologies designed to increase the capacity and speed of mobile telephone networks and is often marketed as 4G. In the uplink, LTE uses a pre-coded version of orthogonal frequency-division multiplexing (OFDM) called Single Carrier Frequency Division Multiple Access (SC-FDMA). In the uplink, there are typically three physical channels.

The physical channels in mobile radio systems are usually multipath fading channels, which can cause inter channel interference in the received signal. To remove this interference from the signal, a variety of equalizers can be used based on detection algorithms. These detectors require knowledge of the channel impulse response (CIR), which can be provided by a separate channel estimator. Usually, channel estimation is based on the known sequence of bits, which is unique for a certain transmitter and which is repeated in every transmission burst. Thus, the channel estimator is able to estimate CIR for each burst separately by exploiting the known transmitted bits and the corresponding received samples.

Within LTE, coherent detection can be used to improve the detection and decoding processes at the receiver. In order to facilitate a coherent detection process, the receiver needs to estimate the current channel conditions which may be time varying and which may also depend upon the propagation environment. Typically, pilot symbols, whose data information is known to the receiver, are inserted into the signal at the transmitter. Alternatively, the transmitter may insert pilot symbols periodically, using the individual channelization codes of each multiplexed signal; thus each signal has its own time-multiplexed pilot symbols inserted in between data symbols. At the receiver, changes in the channel conditions are interpolated using appropriate algorithms.

In radio technologies such as LTE, multiple-input and multiple-output (MIMO) is the use of multiple antennas at both the transmitter and receiver to improve communication performance and to exploit the availability of multiple independent radio terminals in order to enhance the communication capabilities of each individual terminal. Multi-user MIMO (MU-MIMO) technology is a likely candidate technology for adoption by the industry since MU-MIMO is more feasible to low complexity mobiles with small number of reception antennas than single user MIMO (SU-MIMO).

Thus, there is a need for flexible and improved channel estimation in LTE for the uplink SC-FDMA when MU-MIMO is used.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is one aspect of the disclosed embodiments to provide a method for canonical channel estimation during LTE uplink.

It is a further aspect of the disclosed embodiments to provide a flexible and improved method of channel estimation in LTE for the uplink SC-FDMA when MU-MIMO is employed.

It is yet a further aspect of the disclosed embodiments to convolve the frequency spectrum in the frequency domain with truncated window function to obtain a time domain CIR which is transformed to the frequency domain to produce a down sampled user channel response which is linearly interpolated to generate a channel estimate for subcarriers.

The aforementioned aspects and other objectives and advantages can now be achieved as described herein. A method and system are disclosed for canonical channel estimation in the LTE uplink where a matched-filter signal is generated and then converted to the frequency spectrum which is then convolved in the frequency domain with a truncated window function to obtain a time domain CIR. The time domain CIR is then transformed to frequency domain to produce a down sampled user channel response which is then linearly interpolated to provide a channel estimate for a plurality of subcarriers.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 1:
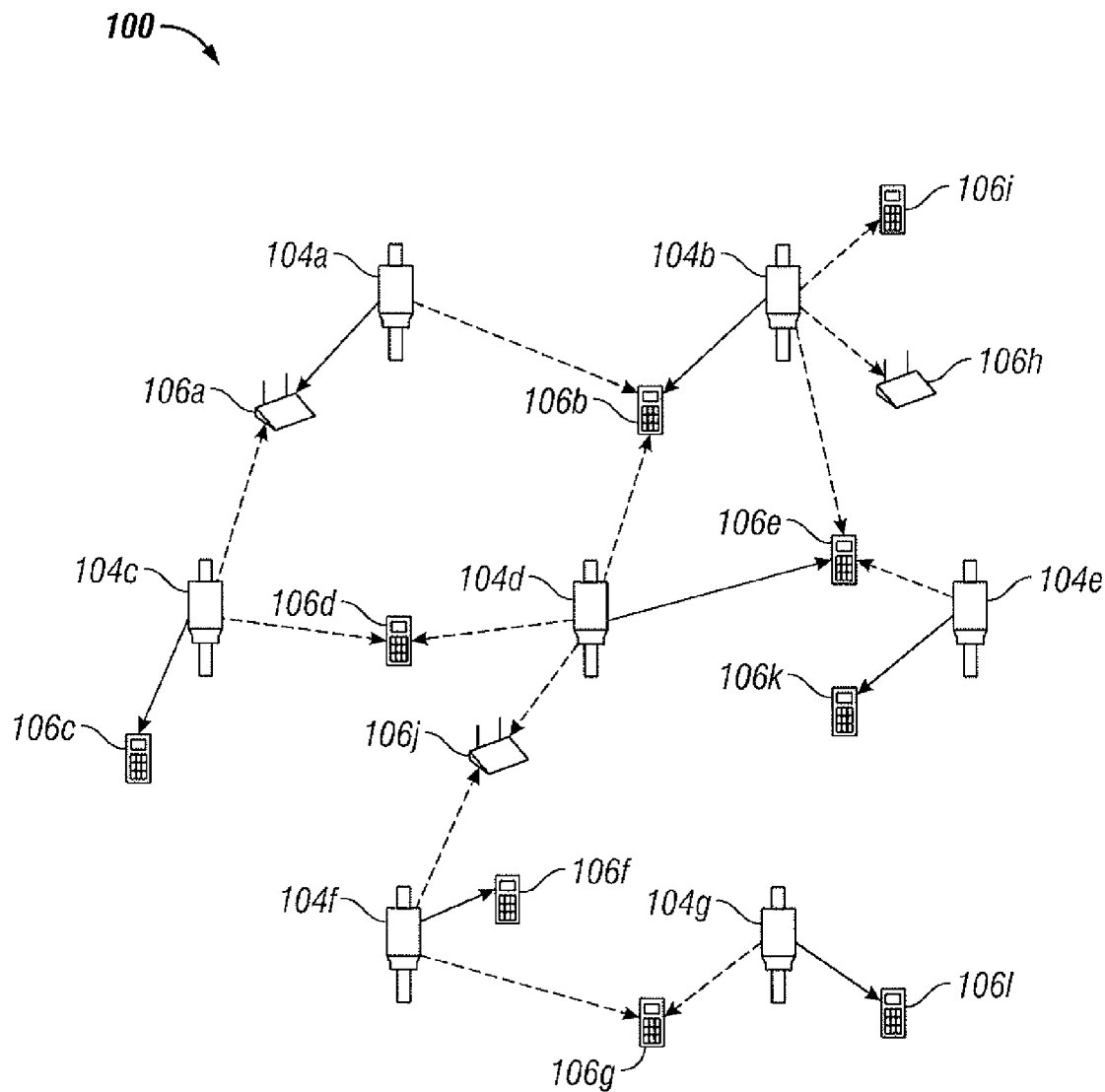
FIG. 1 illustrates an exemplary wireless communication network.

FIG. 1 illustrates an exemplary wireless communication network 100 in which embodiments may be implemented. The wireless communication network 100 is configured to support communication between a number of users. Communication coverage may be provided by one or more nodes 104 (e.g., base stations) such as, for example, nodes 104a-104g. The nodes 104 may interact with a plurality of access terminals (ATs) such as, for example, ATs 106a-106l.

Each AT 106 may communicate with one or more nodes 104 on a downlink or an uplink at a given moment. A downlink is a communication link from a node to an AT. An uplink is a communication link from an AT to a node. The nodes 104 may be interconnected, for example, by appropriate wired or wireless interfaces and may be able to communicate with each other.

As described above, a node 104 may provide an access terminal (AT) 106 access within its coverage area to a communications network such as, for example, the internet or a cellular network. An AT 106 may be a wireless communication device (e.g., a mobile phone, router, personal computer, server, etc.) employed by a user to send and receive voice or data over a communications network. An access terminal may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

A wireless multiple-access communication system may simultaneously support communication for multiple wireless access terminals. As mentioned above, each access terminal may communicate with one or more nodes via transmissions on the downlink and uplink links. This communication link may be established via a single-in-single-out system, a multiple-user multiple-in-multiple-out system, or other types of systems.

A MIMO system employs multiple transmit antennas and multiple receive antennas for data transmission. A MIMO channel formed by the transmit and receive antennas may comprise independent channels, which are also referred to as spatial channels. Each of the independent channels corresponds to a dimension. The MIMO system may provide improved performance (e.g., higher throughput and/or greater reliability) if the additional dimensionalities created by the multiple transmit and receive antennas are utilized.

The teachings herein may be incorporated into a device (e.g., a node, an access terminal, etc.) employing various components for communicating with at least one other device.

Generally in LTE uplink, MU-MIMO channel can be estimated either in time or frequency by first generating a matched filter (MF) signal in the frequency domain. A Zadoff-Chu sequence can be matched to transmitted pilot symbols to produce the frequency spectrum $Y(\omega)=X(\omega)*P*(\omega)$, where X is the obtained signal in frequency domain and P is the generated Zadoff-Chu signal matched to a pilot symbol. It is then necessary to obtain the time-domain channel impulse response (CIR) and to distinguish between different MIMO users transmitting a same pilot shifted in time, by performing inverse Discrete Fourier transformation (IDFT) to time domain in order to yield:

$$CIR:y_{all\ Users}(t)=IDFT\{Y(\omega)\}$$

Figure 2:
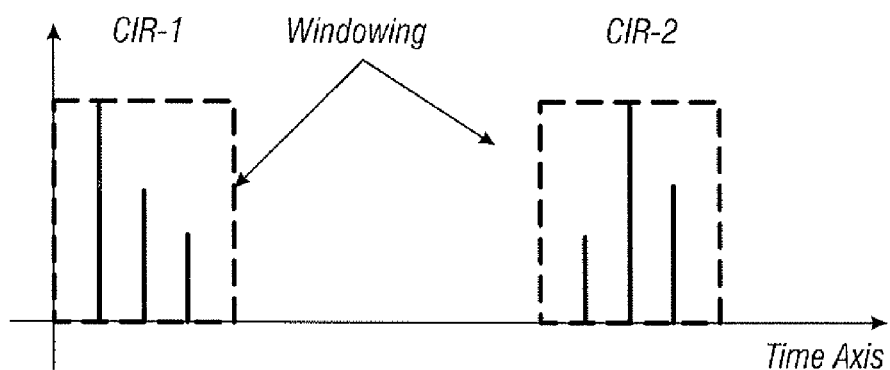
FIG. 2 illustrates how the CIR in the time domain can be separated with a time shifted window mask resulting in CIR per user.

FIG. 2 illustrates how the CIR in time domain can be separated with a time shifted window mask, W, resulting in CIR per user $Y_{usersW}(t)$. Window masking refers to a process carried out during transmission wherein different user Zadoff-Chu sequences are differentiated by using a phase shifted version of the Zadoff-Chu sequence in the frequency domain. In the time domain, this is a time shift which can be used to select the user channel estimates. Because the equalizer, which functions to correct for distortion and separate MIMO users, is implemented in frequency domain, it is necessary to transform a user's CIR back to frequency domain by zero padding the CIR desired band-width (number of subcarriers) utilizing discrete Fourier transformation (DFT) to yield $Y_{userWZP}(\omega)=DFT\{y_{userWZP}(t)\}$.

Significant user interference can be observed at the output of the DFT, or the frequency domain CIR, and therefore, an averaging or smoothing filter is needed. This is accomplished by convolving $Y_{userWZP}(jw)$ with [1 1 1 1 1] to yield $Y_{user}(jw)=Y_{user}(jw)*[1\ 1\ 1\ 1 1]$.

The present invention provides a method by which the complexity of the presented algorithms can be reduced significantly. The zero padding in the time domain discussed above is essentially equivalent to an interpolation in the frequency domain. Due to inter-user interference, interpolation by zero-padding in time domain is not necessarily optimal for performance and can be unnecessarily complex, thus requiring the smoothing filter. To reduce complexity, a user's CIR can be directly transformed back to the frequency domain without a zero padding stage. Discrete Fourier transformation of $Y_{userW}(t)$ results in a down sampled user channel response in frequency domain, $Y_{userW}(\omega)=DFT\{Y_{userW}(t)\}$. The down sampled user channel response, $Y_{userDS}(\omega)$ is then interpolated linearly to find the channel estimates at all subcarrier locations, e.g. assuming 4 MU-MIMO users:

$$[Y_{user}(\omega_{4k-0})\ ...\ Y_{user}(\omega_{4k-3})] = $$
$$[Y_{userDS}(\omega_k)Y_{userDS}(\omega_{k-1})]\begin{bmatrix} 1.00 & 0.66 & 0.50 & 0.33 \\ 0.00 & 0.33 & 0.50 & .066 \end{bmatrix}$$

Consequently, the complexity of the most computationally intensive operations in the channel estimation algorithm can be reduced by a factor of 8.

The complexity can be reduced further by utilizing simplified frequency domain equivalents. In order to obtain the time-domain CIR and to distinguish between different MIMO users, transmitting a same pilot shifted in time, it is necessary to perform IFFT to time domain and windowing. These two steps can be implemented in the frequency domain by convolving $Y(\omega)$ with a truncated windowing function $W_{user}(\omega)$ to yield:

$$Y_{UseDS}(\omega)=Y(\omega)*W_{user}((\omega).$$

Phase correction is then accomplished by $$Y_{UserDS}(\omega_k)=Y'_{userDS}(\omega_k)\cdot\exp(j(0:N)2\pi\delta f_{user}$$

where $\delta f_{user}$ is a user dependent phase shift specified in the standard document and N is the number of subcarriers, or the maximum size of the truncated windowing function.

Figure 3:
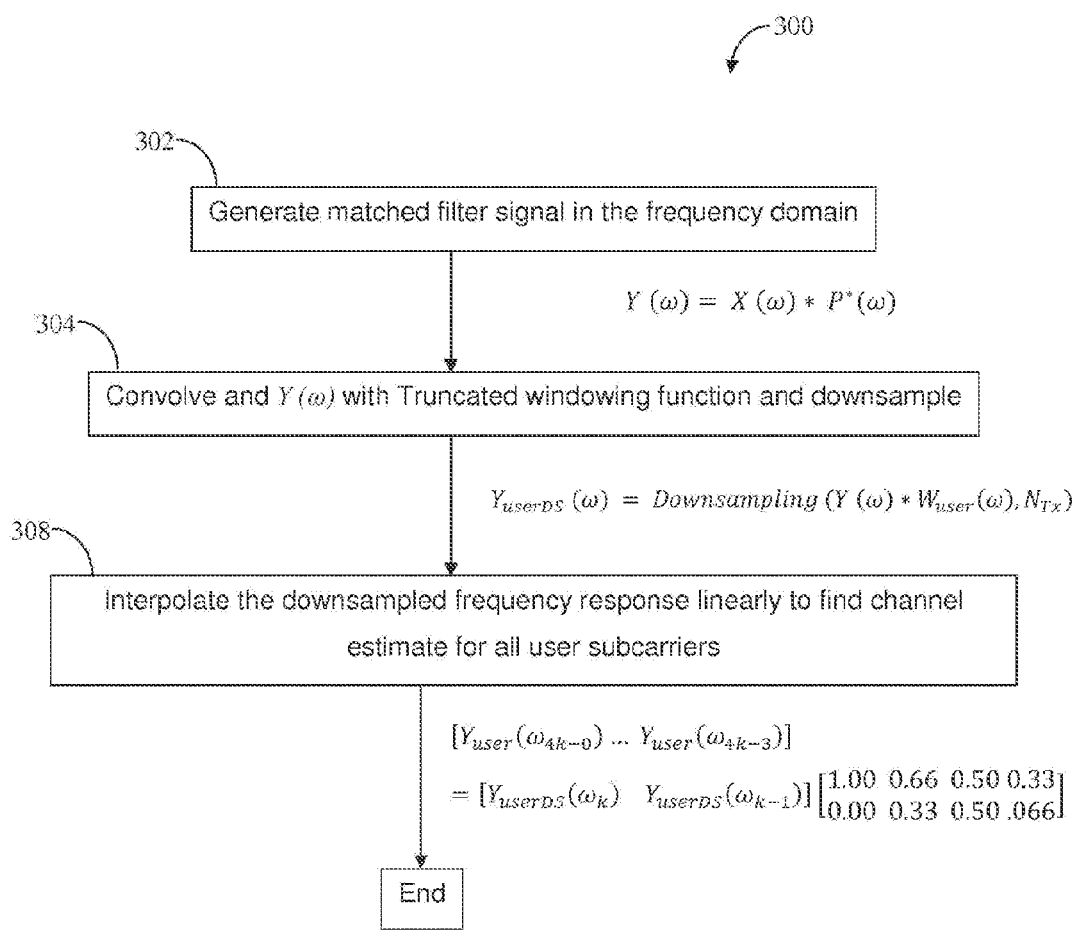
FIG. 3 illustrates a high level flow chart of a method for performing channel estimation within LTE at only canonical locations to reduce complexity without loss in channel entropy.

FIG. 3 illustrates a high level flow chart of a method 300 for performing channel estimation within LTE at only canonical locations to reduce complexity without loss in channel entropy. The process begins, as shown in block 302, by generating a MF signal in frequency domain to obtain $Y(\omega)=X(\omega)*P*(\omega)$. Then, as shown in block 304, frequency domain windowing and downsampling is performed to obtain the frequency domain channel $Y_{UserDS}(\omega)=Y(\omega)*W_{user}(\omega)$. This step results in a down sampled user channel response. $Y_{userDS}(\omega)$ is equal to the Discrete Fourier Transform of the windowed time domain sequence containing the channel impulse response of one user. $Y_{userW}(t)$. As shown in block 306, a phase correction is then performed. The channel estimate for all user subcarriers is then obtained by linearly interpolating the down sampled channel frequency response, as shown in block 308. Consequently, the complexity of the most computationally intensive operations in the channel estimation method can be significantly reduced.

While exemplary embodiments have been described with respect to a wireless communication network, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, or micro-controller. The aforementioned method may also be implemented within a digital signal processor having specialized hardware to perform interpolation operations. Such hardware and software may be embodied within circuits implemented within a data processing system.

Figure 4:
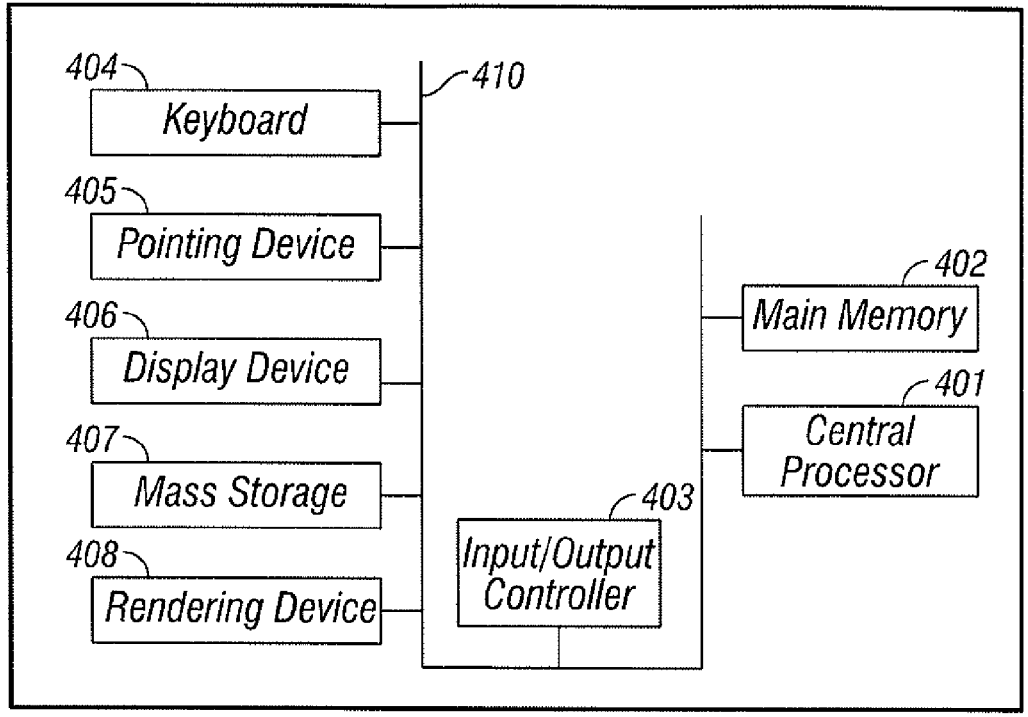
FIG. 4 illustrates a schematic view of a computer system, in accordance with the disclosed embodiments.
Figure 5:
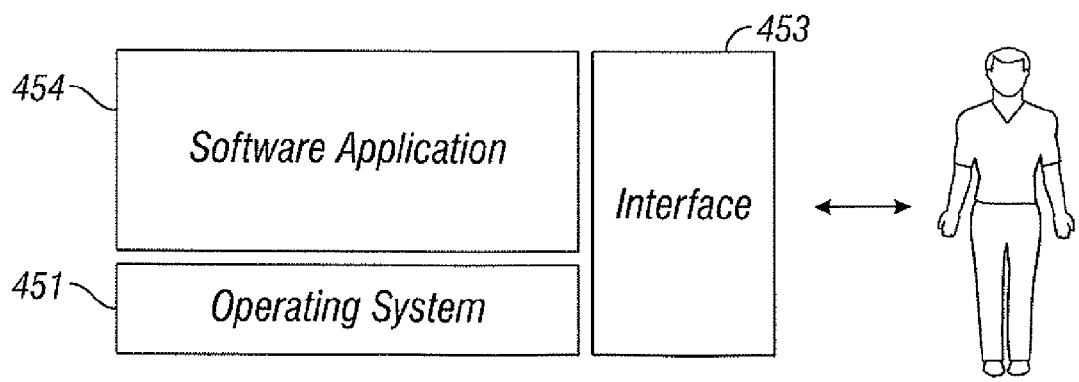
FIG. 5 illustrates a computer software system for directing the operation of the data-processing system depicted in FIG. 4.

FIGS. 4-5 are provided as exemplary diagrams of data-processing environments in which embodiments may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, the disclosed embodiments may be implemented in the context of a data-processing system 400 that includes, for example, a central processor 401, a main memory 402, an input/output controller 403, and a mass storage 407 (e.g., a hard disk). Additional input/output devices such as a keyboard 404, a pointing device 405 (e.g., such as a mouse, track ball, pen device, etc), and a display device 406 may be associated with the data-processing system 400 as desired. As illustrated, the various components of data-processing system 400 can communicate electronically through a system bus 410 or similar architecture. The system bus 410 may be, for example, a subsystem that transfers data between, for example, computer components within data-processing system 400 or to and from other data-processing devices, components, computers, etc.

FIG. 5 illustrates a computer software system 450 for directing the operation of the data-processing system 100 depicted in FIG. 4. Software application 454, stored in main memory 402 and on mass storage 407, generally includes a kernel or operating system 451 and a shell or interface 453. One or more application programs, such as software application 454, may be "loaded" (i.e., transferred from mass storage 407 into the main memory 402) for execution by the data-processing system 400. The data-processing system 400 receives user commands and data through user interface 453; these inputs may then be acted upon by the data-processing system 400 in accordance with instructions from operating system module 451 and/or software application 454.

It is to be understood that the embodiments and variations shown and described herein are merely illustrative of the principles of this invention and that various modifications may be implemented by those skilled in the art without departing from the scope and spirit of the invention.

What is claimed is:

1. A method for canonical channel estimation in a receiver of a wireless network utilizing a digital signal processor, said method comprising:
    utilizing the digital signal processor to match a sequence to transmitted pilot symbols to produce a frequency spectrum, $Y(\omega)=X(\omega)*P*(\omega)$, wherein X is the obtained signal in a frequency domain and P is a generated Zadoff-Chu signal matched to pilot symbol;
    obtaining a down sampled time-domain channel impulse response (CIR) per user, $Y_{UserDS}(\omega)$, by convolving said frequency spectrum, $Y(\omega)$, with a truncated windowing function, $W_{User}(\omega)$, in the frequency domain utilizing equation $Y_{UserDS}(\omega)=Y(\omega)*W_{User}(\omega)$;
    performing phase correction in the frequency domain on said CIR, $Y_{UserDS}(\omega)$, utilizing $Y'_{UserDS}(\omega)\cdot\exp(j(0:N)2\pi\delta f_{User})$, wherein $\delta f_{User}$ is a user dependent phase shift and N is the number of subcarriers;
    linearly interpolating said phase corrected CIR, $Y_{UserDS}(\omega)$, to produce channel estimates at all subcarrier locations, $[Y_{User}(\omega_{4k-0})\ldots Y_{User}(\omega_{4k-3})]$.

2. A non-transitory computer-readable medium for canonical channel estimation, said non-transitory computer-readable medium embodying computer program code, said computer program code comprising computer executable instructions configured to:
    match a sequence to transmitted pilot symbols to produce a frequency spectrum, $Y(\omega)=X(\omega)*P*(\omega)$, wherein X is the obtained signal in a frequency domain and P is a generated Zadoff-Chu signal matched to pilot symbol;
    obtain a down sampled time-domain channel impulse response (CIR) per user, $Y_{UserDS}(\omega)$, by convolving said frequency spectrum, $Y(\omega)$, with a truncated windowing function, $W_{User}(\omega)$, in the frequency domain utilizing equation $Y_{UserDS}(\omega)=Y(\omega)*W_{User}(\omega)$;
    perform phase correction in the frequency domain on said CIR, $Y_{UserDS}(\omega)$, utilizing $Y'_{UserDS}(\omega)\cdot\exp(j(0:N)2\pi\delta f_{User})$, wherein $\delta f_{User}$ is a user dependent phase shift and N is the number of subcarriers;
    linearly interpolate said phase corrected CIR, $Y_{UserDS}(\omega)$, to produce channel estimates at all subcarrier locations, $[Y_{User}(\omega_{4k-0})\ldots Y_{User}(\omega_{4k-3})]$.

3. The non-transitory computer-readable medium of claim 2, wherein said truncated windowing function comprises a particular size.

4. The non-transitory computer-readable medium of claim 3, wherein said particular size is limited to said plurality of user subcarriers.

5. A system for canonical channel estimation, said system comprising:
    a data processing device having a central processor; and
    a non-transitory computer-readable medium embodying computer code, said non-transitory computer-readable medium being implemented on said data processing device, said computer program code comprising instructions executable by said central processor and configured to:
    match a sequence to transmitted pilot symbols to produce a frequency spectrum, $Y(\omega)=X(\omega)*P*(\omega)$, wherein X is the obtained signal in a frequency domain and P is a generated Zadoff-Chu signal matched to pilot symbol;
    obtain a down sampled time-domain channel impulse response (CIR) per user, $Y_{UserDS}(\omega)$, by convolving said frequency spectrum, $Y(\omega)$, with a truncated windowing function, $W_{User}(\omega)$, in the frequency domain utilizing equation $Y_{UserDS}(\omega)=Y(\omega)*W_{User}(\omega)$;

perform phase correction in the frequency domain on said CIR, $Y_{UserDS}(\omega)$, utilizing $Y'_{UserDS}(\omega) \cdot \exp(j(0:N) 2\pi \delta f_{User})$, wherein $\delta f_{User}$ is a user dependent phase shift and N is the number of subcarriers;

linearly interpolate said phase corrected CIR, $Y_{UserDS}(\omega)$, to produce channel estimates at all subcarrier locations, $[Y_{User}(\omega_{4k-0}) \ldots Y_{User}(\omega_{4k-3})]$.

* * * * *